United States Patent [19]
Gits

[11] 4,103,906
[45] Aug. 1, 1978

[54] ROTARY SEAL WITH RESILIENT DIAPHRAGM

[76] Inventor: Norbert W. Gits, 6417 Blackhawk Trail, Indian Head Park, Ill. 60525

[21] Appl. No.: 850,542
[22] Filed: Nov. 11, 1977
[51] Int. Cl.² ............................................. F16J 15/34
[52] U.S. Cl. ........................................ 277/88; 277/42; 277/205
[58] Field of Search .................................. 277/37–43, 277/65, 81 R, 86–88, 92, 93 R, 93 SD, 96 A, 205

[56] References Cited
U.S. PATENT DOCUMENTS

| 2,395,359 | 2/1946 | Vedovell | 277/42 |
| 2,650,841 | 9/1953 | Meyer | 277/42 |
| 2,892,642 | 6/1959 | Payne | 277/42 |
| 2,984,505 | 5/1961 | Andresen et al. | 277/88 X |
| 3,120,959 | 2/1964 | Jensen et al. | 277/37 |
| 3,536,333 | 10/1970 | Gits et al. | 277/37 |

FOREIGN PATENT DOCUMENTS 1,450,663   7/1966   France ........................................ 277/42

Primary Examiner—Robert S. Ward, Jr.
Attorney, Agent, or Firm—Leonard S. Knox

[57] ABSTRACT

A resilient diaphragm separates one side of the rotary seal, such as is used to seal the space between a rotatable shaft and an adjacent surface of a machine housing through which the shaft extends. The seal assembly employs a casing which is secured to the housing and contains, or has adjacent thereto, parts of the seal including a sealing ring or pad which has rubbing contact with a pad on the housing. The sealing ring which, in turn, retains certain parts of the assembly, is held to the casing by means of an annular flange engaged behind a flange of the casing by the use of resilient parts put together with a snap fit. That is, the flange of the sealing ring is forced past the flange of the casing while both parts undergo momentary deformation. Thereafter the sealing ring is semi-permanently retained in the assembly by the casing flange. The present invention has reference to improvements in the resilient diaphragm which isolates one side of the rubbing surfaces from the other side.

11 Claims, 3 Drawing Figures

ROTARY SEAL WITH RESILIENT DIAPHRAGM

BACKGROUND OF THE INVENTION

The present invention constitutes improvements in the rotary seal disclosed in my U.S. Pat. No.3,536,333, granted Oct. 27, 1970. In that patent I disclosed a fixed casing of cup-like construction including an inner shell portion which is replaced in the present concept by an extension of the seal ring along the shaft. This extension serves the same purpose as the inner shell which it replaces but with advantages not inherent in the prior seal.

In another aspect the foregoing construction permits the use of a secondary seal in the form of a diaphragm as well as an "O-ring" seal.

Another object is to provide a rotary seal which is more heat-resistant than that disclosed in my said patent by virtue of the use of a seal ring of thermosetting plastics composition, capable of withstanding the heat generated by the rubbing contact of the seal ring on the housing.

Another advantage of the present invention consists in utilizing a seal ring sleeve of a material which is basically a bearing material, so that, in the event of bearing failure the seal can serve as an emergency bearing.

Another advantage of my improved seal resides in the adaptability to a situation where electrolytic action can occur. This behaviour can erode the inner shell of the metal seals commonly used, e.g., in swimming pool installations. Since, with the present seal, electrically non-conducting material is used, the problem is effectively solved.

SUMMARY OF THE INVENTION

Regarded broadly, the invention, in one aspect, resides in a modified configuration of the diaphragm and its mounting which results in greater reliability and extended life, and, in another aspect, resides in the novel use of materials for certain parts of the seal assembly which, when juxtaposed would otherwise give rise to deleterious behaviour. By use of the instant improvements, conduction of heat is effected much more rapidly and damage to the seal assembly is eliminated.

DESCRIPTION OF THE PREFERRED EMBODIMENT

Figure 2:
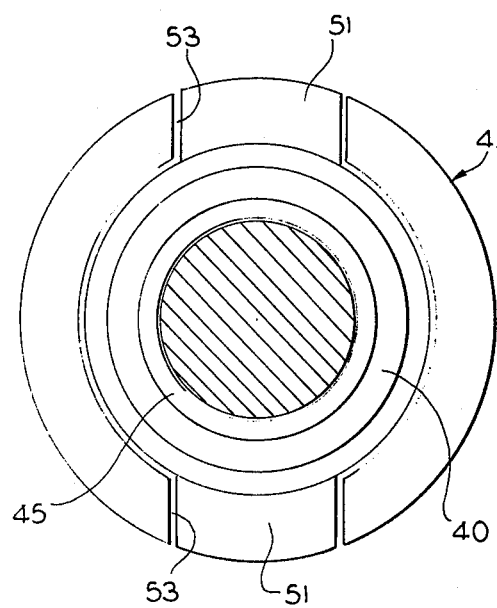
FIG. 2 is an end elevation of the seal assembly as viewed from the left to FIG. 1.
Figure 1:
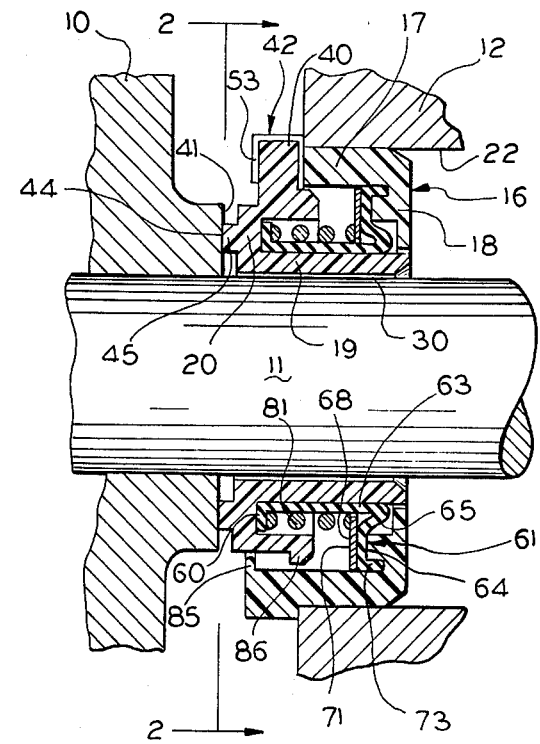
FIG. 1 is a cross section taken in a plane through the axis of rotation.
Figure 3:
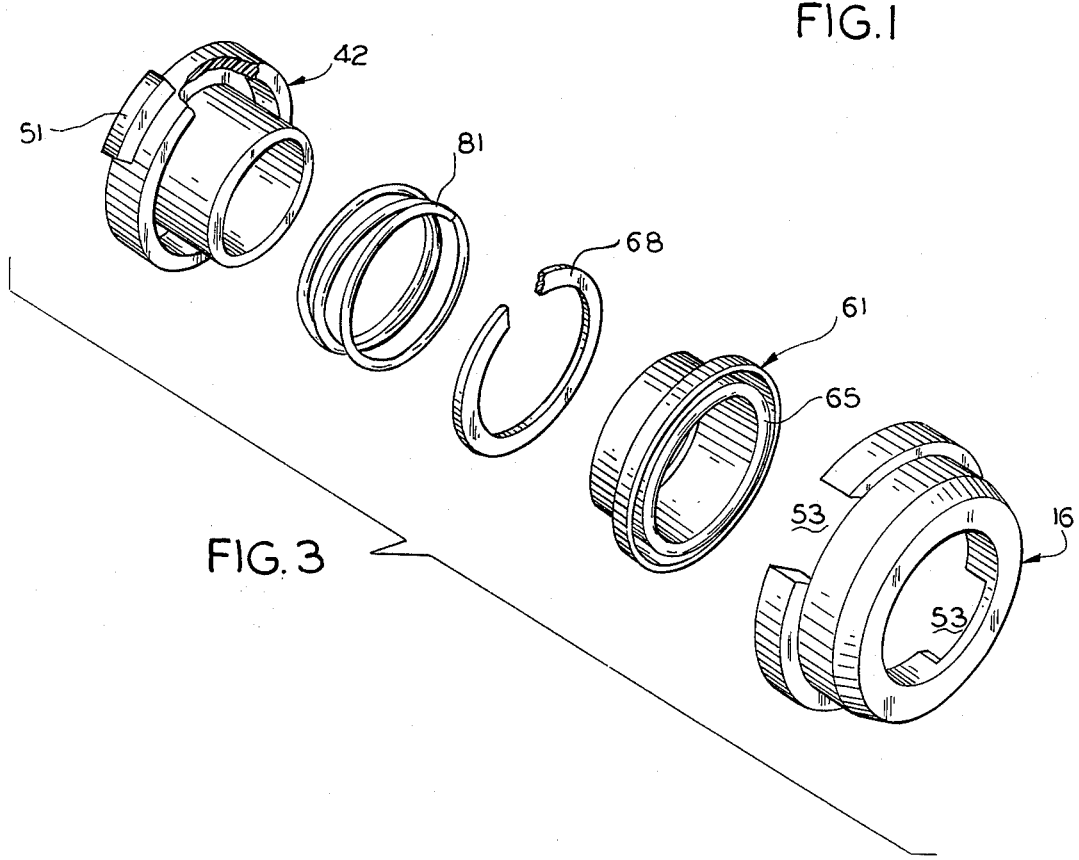
FIG. 3 is an exploded, isometric view of the seal assembly.

Devices embodying the principles of the invention are used not only to seal the interior of a machine housing, e.g., of a pump or compressor, against entry of lubricant and foreign matter but to preclude exit of the gas or fluid past a shaft which extends outwardly of the housing. Accordingly, a typical environment would be as shown in FIG. 1, wherein a fixed machine housing is indicated at 10, the shaft at 11 and a member rotatable with the shaft, e.g., a pump impeller, at 12. A commercial form of seal is generally reversible, viz., the fixed part thereof may be received in a recess of the housing and the rubbing contact made with a rotatable part within the housing.

In the example, a device embodying the principles of the invention comprises an annular casing 16 comprising an annular end wall 18 and an annular lateral wall 17, this latter being assembled with a press fit in a bore 22 of the housing 12. The seal ring 42 comprises an annular sleeve 19 having running clearance 30 with the rotating shaft 11. The sleeve 19 is integral with an annular member 20 which is integral with a ring 40. An annular surface 44 of a member 45 serves as a rubbing ring which bears against a fiducial surface 41 of the housing 10. The member 45 is of some material which will withstand the heat and friction resulting from the rubbing contact, preferably a thermosetting plastics composition.

The member 42 is driven by the member 16 through a pair of dogs 51-51 extending radially from the ring 40 and received in respective recesses 53-53 in the member 42.

It will be understood that a seal of the class herein disclosed should embody some provision for misalignment between the two rubbing surfaces 41 and 44. To this end the casing 16 is coupled to the member 42 not only by the dogs 51-51 and complementary recesses 53-53 which engage each other with a reasonably snug fit, as well as by a resilient diaphragm 61. In the example the diaphragm is of synthetic rubber, e.g. BUNA N, and comprises a sleeve portion 63 and an annular flange 64, these two latter meeting in a readily deformable reinforcement portion 65, substantially semicircular in transverse cross section. It is to be observed that the parts adjacent the portion 65 are so constructed as to allow unobstructed deflection thereof in response to misalignment of the driving and driven parts of the device.

To obviate deflection of the web 64 a washer 71 is positioned against the left-hand face of the diaphragm 61. By so doing, flexure of the diaphragm 61 is confined more or less to the portion 65 thereof rather than to allow uncontrolled flexure thereof. The portion 61 of the diaphragm has a transverse cross section which is approximately 270° of arc. Thus flexure may be accommodated radially as well as axially. A compression spring 81 is interposed between the washer 68 and the ring 40 through the intermediate flange 60 in order to anchor the right hand end of the diaphragm through the washer 68 and thereby avoid indiscriminate collapse thereof between its ends, and to provide the necessary axial force against the rubbing faces 41 and 44.

The member 20 is desirably a one-piece structure of some suitable thermosetting plastics composition. It is marked for good dimensional stability, minimum wear, freedom from significant distortion under heat, and good impact strength.

To enable initial assembly of the several parts of the device and to dispense with elaborate means to fasten them, such as special fixtures, the parts 16 and 40 are snapfitted together. For this purpose the member 12 has a circular lip 85 and the member 42 has a circular lip 86. The inner diameter of the lip 85 is slightly less than the outer diameter of the lip 86 to provide interference of a degree permitting their snap-type engagement. Should a device embodying the invention require disassembly for repairs the relative dimensions are so chosen as to enable the flanges 85 and 86 to be forced apart and, following servicing, to be relocated. In this case the flanges are desirably chamfered on both sides. The material and dimensions of the parts 85 and 86 are so selected as to permit the required momentary deformation without the hazard of breakage.

Since the diaphragm 61 does not slide against any other part of the seal assembly, no resistance is offered to either forward or backward movement of the related parts. By so doing a hysteresis condition which could otherwise lead to leakage during operation is avoided. Stated otherwise, as the seal faces 41 and 44 rub against each other, any slight misalignment thereof out of a plane normal to the axis of the shaft will result in forward and backward movement of that part of the diaphragm, i.e., the tubular portion 63 which is more or less coextensive with the spring 81. If, because of the drag of sliding components, the flexible part of the secondary seal cannot react fast enough to follow the errors introduced by such drag, leakage could occur.

During operation, the diaphragm 71 tends to adhere to the surface with the desired flexure upon which the diaphragm depends for acceptable function, i.e., forward and backward movement of the seal. However, the configuration of the diaphragm restricts its peeling action to a minimum as it travels rearward (toward the left) or stretches, as it travels forward (toward the right).

Sometimes the medium being sealed against will add to problems of adhesion and fretting. The positive seal at both ends of the diaphragm eliminates these problems.

The inverted convolution 65 imparts flexibility upon both forward and backward movement of the seal. Additionally the convolution 65 behaves in the manner of a ball joint further to accommodate any such angular seal face misalignment to a considerable degree.

By the use of a sleeve-like configuration for the diaphragm as well as the stiffness of the annulus 68, resistance to axial forces is presented. In this way additional sealing advantage is obtained since the pressure exerted by the medium being sealed against results in tight contrast between these two components. Such additional reinforcement also obviates any tendency of the diaphragm to rupture under high pressure which may be exerted by the medium.

Appreciable pressure balance inheres in the invention diaphragm as compared to similar diaphragms, since the diaphragm profile can be closer to the diameter of the shaft. For this reason reduced mechanical spring load may be realized. This, in turn, reduces the heat of friction of the seal as a whole with resulting increased life.

I claim:

1. In a rotary seal for use between a fixed part (10) and a shaft (11) rotating relative to the fixed part (12), the fixed part (10) and shaft (11) each having a pad (41, 44) in face-to-face rubbing contact, an annular member (16) surrounding the shaft (11) and means to prevent rotation of the member (16) relative to the fixed part (10), the improvement which comprises means constituting a liquidtight seal between the fixed and rotatable parts (10, 11), said member (16) and annular member (20) having respective male and female loosely-interengaged elements (16, 14) for joint coupling thereof, the annular member (20) and the member (16) having interior cavities together defining a chamber to house a diaphragm (61) sealing the chamber against leakage of the medium being sealed, and a compression spring (81) biasing the rotatable seal pad (41) into rubbing contact with the fixed part (12), the part (10) having an annular hub (19) extending along substantially the whole axial length of the seal assembly, the diaphragm (61) being of sleeve-like form terminating at one end in an integral bead (65) of substantially U-shaped transverse cross section deformable both axially and radially in response to forces applied radially and axially to the diaphragm, the compression spring (81) being inerposed between respective shoulders at respective ends of the diaphragm to bias the pads (41, 44) together in rubbing abutment.

2. In a rotary seal of the class which includes a first cup-shaped member (16) and a second cup-shaped member (20) coupled non-rotatably to said first member, said first and second members (16, 20) having respective male and female means (51, 53) constituting the coupling, the second member (20) having a rubbing ring (45) bearing slidably on a fiducial surface (44) of a fixed part of the machine with which the seal is assembled, the improvement which comprises a tubular extension (19) of the second cup member (20), an essentially tubular, deformable diaphragm (63) outwardly of the extension and snugly received thereover, said diaphragm (63) terminating at one end in a substantially semi-circularly transverse rim portion (65) adapted to flex in axial and radial directions, a radial flange (64) extending radially outwardly from the rim portion, rigid plate means (71) clamping the flange (64) against axial displacement, and bias means (81) between the plate means (71) and second cup means (20) to apply force between the first and second cup member rubbing surfaces (41, 44).

3. The combination in accordance with claim 2 in which the extension (19) comprises a thermosetting plastics composition and is integral with the second cup member (20).

4. The combination in accordance with claim 2 further characterized in that the diaphragm, at the end opposite the radial flange (64) has a second radial flange (60) and the bias means (81) also bears on said second radial flange (60).

5. The combination in accordance with claim 1 in which the substantially U-shaped transverse cross section (61) is smoothly merged into the radially-extending flange (64).

6. A generally sleeve-like diaphragm (61) to be interposed between the two parts (16, 40) of a rubbing-type shaft seal in which isolation of one side of the diaphragm from the other side is by means of a sleeve-like member affixed at each end thereof to the driven and driving parts (16, 40) having mutual rubbing contact, the driving and driven members having wall portions defining a substantially annular space therebetween, the diaphragm (61) being housed in said space, one end of the diaphragm having a radially-outwardly directed flange (60) and the other end of the diaphragm having a rim (65) of substantially U-shaped transverse cross section, the bright (65) of the "U" confronting the annular space and adapted to flex both radially and axially.

7. In combination with a seal for use to isolate the wet side from the dry side of a pump or the like, the seal having a fixed cup-shaped casing part (16) and a floating cupshaped casing part (40) splined to the fixed part (10), the second casing part having an axially-extending rigid sleeve (19), the floating part (40) including a first ring (45) in rubbing contact with a second ring (41) on the pump body, a flexible diaphragm supported between the first and second parts (16, 40), the diaphragm comprising a sleeve portion carried on the exterior of the second casing sleeve (19), one end of the diaphragm including a radial flange (60), and the other end of the diaphragm including a reversely bent flange (65) capable of being flexed to accommodate wobble inherent in the second casing part (40), and means to clamp said ends of the diaphragm to the said first and second cup-shaped parts (60, 71).

8. The combination in accordance with claim 7 in which the reversely bent flange (65) has an outwardly extending annulus (73), a compression spring (81) received in the space between the cup-shaped parts (16, 40) and a clamping ring (71) abutting said annulus (73), the ends of the spring bearing on said flange (65) and annulus (73) respectively to bias the rubbing faces (41, 44) into operating abutment.

9. In a shaft seal of the type which comprises a first cup-shaped member (17) to be fixed to the machine, a second cup-shaped member (40) concentric with the first member and floatingly supported thereon, the members together being so constructed and arranged as to define an annular space therebetween, a flexible diaphragm extending from one side of said space to the other to define a leak-proof partition between the members, said diaphragm having a sleeve-like body (61), a first flange (64) integral with and extending radially from one end of the body, a second flange (60) integral with and extending radially from the other end of the body, said first flange (64) abutting a portion of the second cup-shaped member, said second flange (60) abutting a portion of the second cup-shaped member (40) and a compression spring (81) interposed between said two portions.

10. The combination in accordance with claim 8 further comprising a bearing plate interposed between said second flange (60) and compression spring (81).

11. The combination in accordance with claim 9 further characterized by an undulant web (65) joining the sleeve portion (81) to the first flange (64) whereby wobble of the first cup-shaped member (17) about the axis of rotation is permitted.

* * * * *